United States Patent [19]

Gabriel

[11] Patent Number: 5,542,871

[45] Date of Patent: Aug. 6, 1996

[54] ROD FOR CONSTRUCTION SYSTEM

[75] Inventor: Richard Gabriel, Portland, Oreg.

[73] Assignee: Matrix Toys, Ltd., Portland, Oreg.

[21] Appl. No.: 500,314

[22] Filed: Jun. 10, 1995

[51] Int. Cl.$^6$ .................................................. A63H 33/04
[52] U.S. Cl. ........................ 446/126; 403/315; 403/327; 411/508; 24/615
[58] Field of Search ................................. 446/126, 120, 446/121, 122; 24/616, 615, 297, 324; 403/326, 327, 315; 411/508, 913, 21, 58

[56] References Cited

U.S. PATENT DOCUMENTS

| | | | |
|---|---|---|---|
| 4,129,975 | 12/1978 | Gabriel | 446/126 X |
| 5,417,531 | 5/1995 | Brown | 411/21 X |
| 5,433,549 | 7/1995 | McGaffigan | 403/291 X |

OTHER PUBLICATIONS

EPO 0610541A1 Aug. 1994 Sikora.

*Primary Examiner*—Mickey Yu
*Attorney, Agent, or Firm*—Chernoff, Vilhauer, et al.

[57] ABSTRACT

A rod for a construction set includes an elongate strut that extends between opposed of interconnected joint elements. A cavity in each end of the strut slidably supports a clip having opposed inwardly deflectable fingers, with outwardly facing catches at their extremities, that snap fit into the joint openings in the joint element to clamp the joint element between the catches and the ends of the rods. The clips are moveable between closed positions where the fingers are engaged in the joint elements and open positions where the fingers are located completely within the cavity to allow the rod to be removed from opposed joint elements in a structure without disturbing the structure. The struts have slots in their extremities that intersect the cavities, and the fingers have protrusions that extend through the slots to facilitate deflecting the fingers inwardly to release the clips from the joint elements and in moving the clips between their open and closed positions. The lips on the catches, that contact the joint elements, have chamfered side and front edges to allow rotation of the rod relative to the joint element when it is being removed from the joint element in order to reduce the occurrence of bending moments in the clips that can cause breakage.

9 Claims, 5 Drawing Sheets

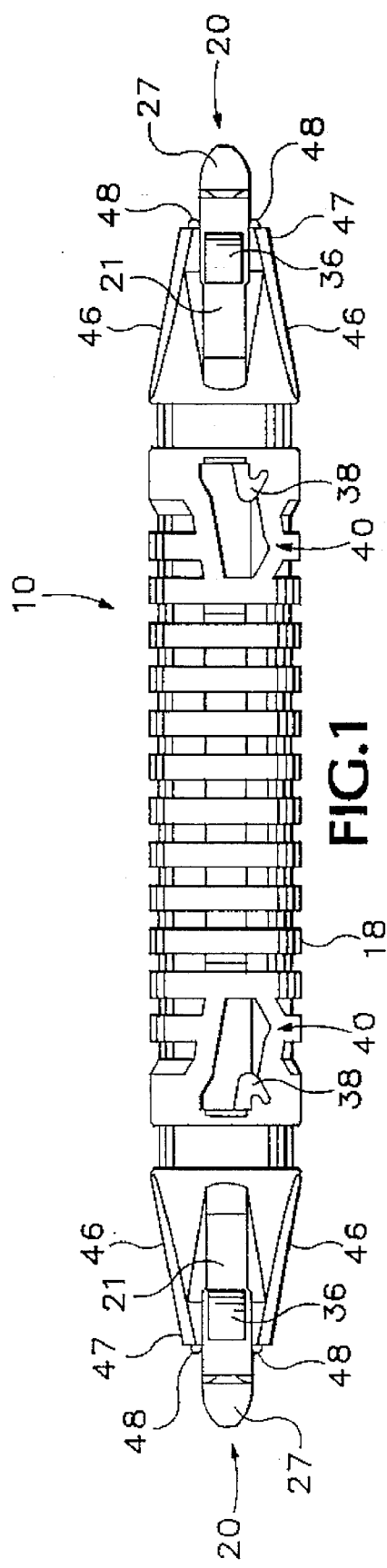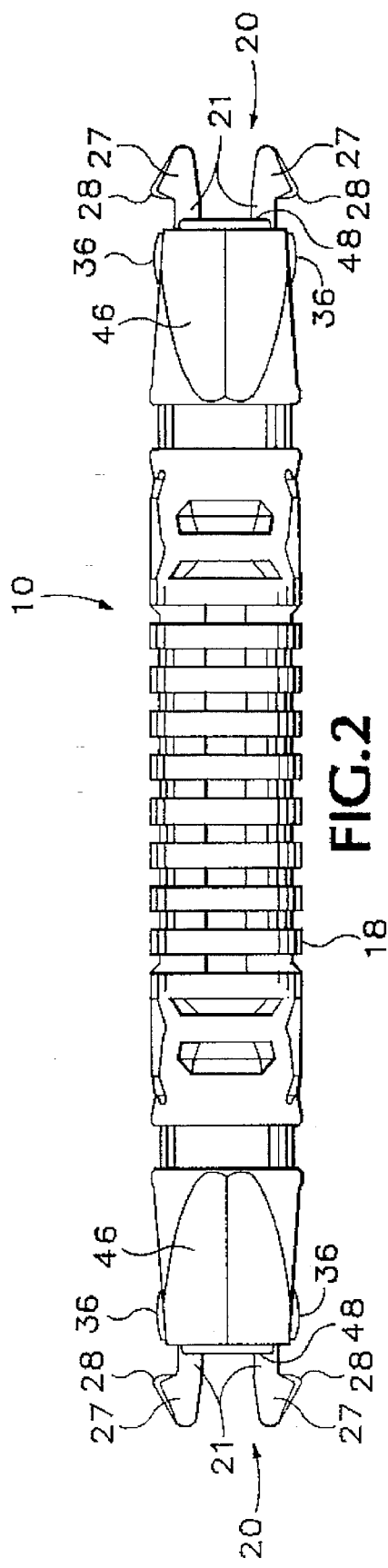

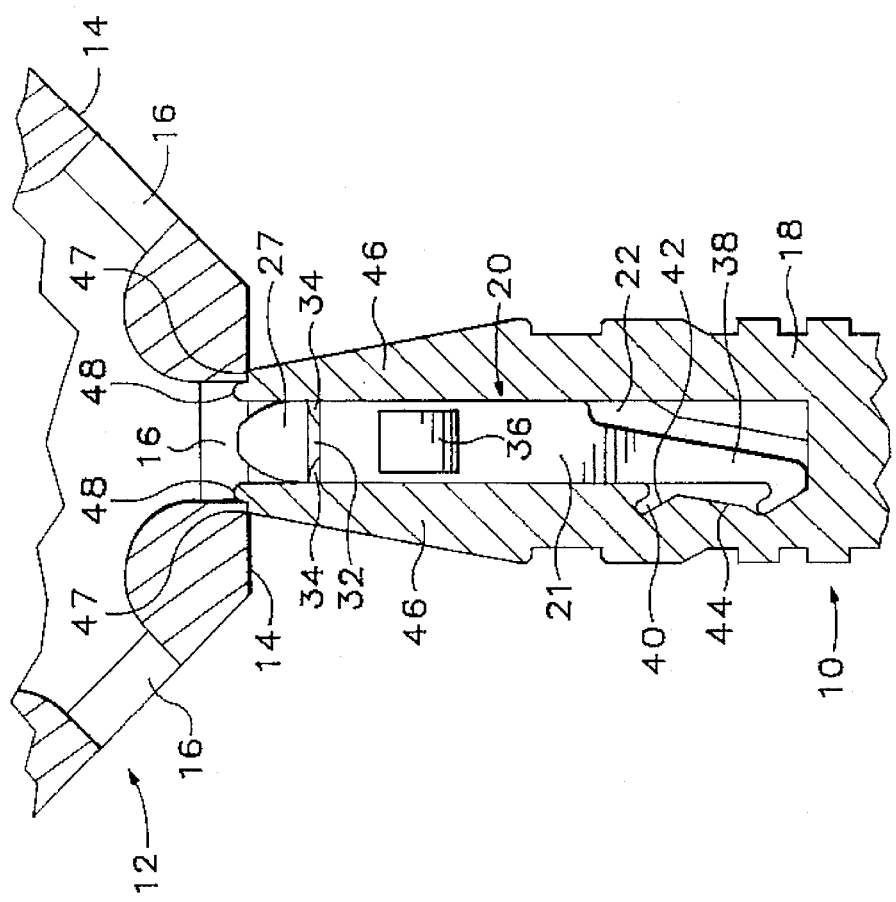
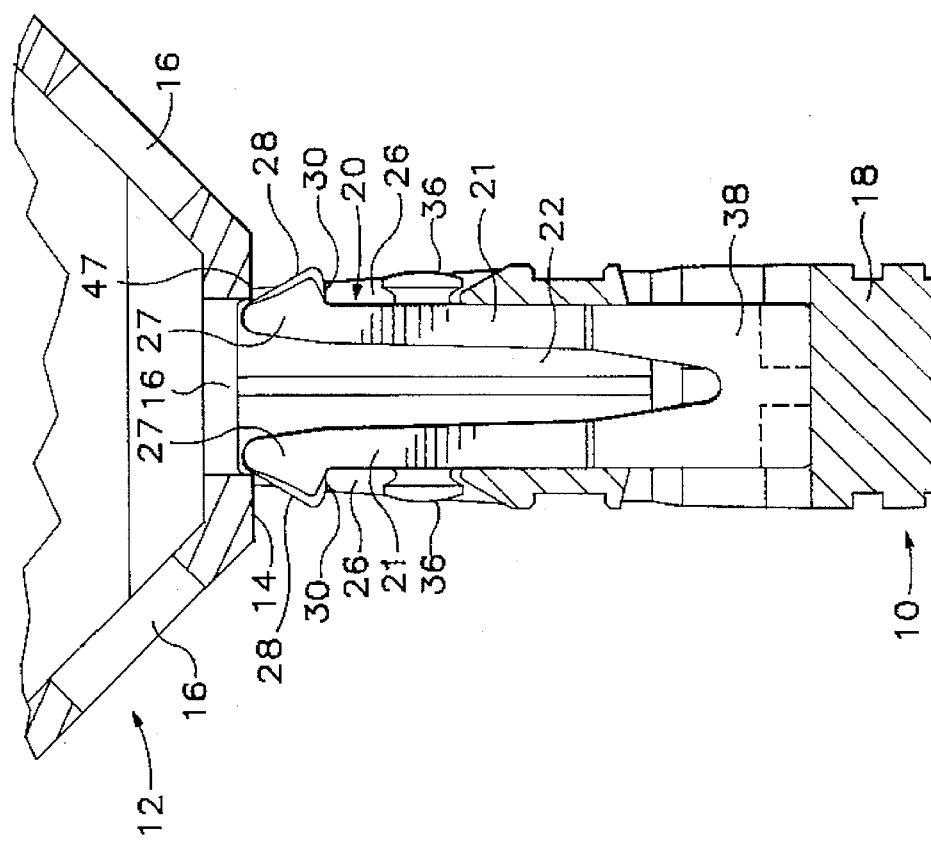

5,542,871

ROD FOR CONSTRUCTION SYSTEM

BACKGROUND AND SUMMARY OF THE INVENTION

This invention relates to rods for toy construction sets, and particularly to rods which are easier to remove and are less likely to be broken while being removed.

Toy construction sets having spaced apart joint elements which are interconnected with elongate rods are well known in the prior art. Such construction sets are shown, for example, in U.S. Pat. No. 4,129,975 where hollow spherical balls having a plurality of planar facets containing joint openings are interconnected by rods having deflectable clips at each end that snap fit into the joint element openings. While such construction sets have considerable play value and allow construction of a wide range of complex structures, they have a couple of shortcomings. First, it is difficult to remove a rod that is connected at both of its ends to joint elements that are embedded in a structure without distorting the structure to the point where it is likely to be torn apart or even be damaged. In addition, when the rods are being removed from a joint element, especially by younger children, it is common to rotate them relative to the joint element which creates a bending moment in the clip which causes it to break. While this problem can be alleviated to some degree by making the rods out of high strength plastics, doing so increase the costs of rods substantially.

The subject invention overcomes the shortcomings of the prior art rods by separating the rods into three separate pieces. An elongate strut which extends between opposed joint elements comprises the body of the rod. The strut has cavities formed in each end which slidably receive clips that connect the rod to the joint elements. Each clip has opposed spaced-apart fingers that are deflectable inwardly toward one another and have outwardly facing catches at their extremities. The clip is moveable in the cavity between an open position, where the clip is located completely in the cavity, and a closed position, where the clip extends through a joint opening, and the joint element is clamped between the catch and the end of the strut.

In a preferred embodiment of the invention, the strut has a slot extending through each end which intersects the cavity. The fingers of the clips have outwardly facing protrusions which are aligned with the catches, and both the protrusions and the catches fit into the slots. The protrusions assist the user in moving the clip between its open and closed positions and in releasing the catches from the joint element when it is desired to remove a rod.

In a preferred embodiment of the invention, the clip has a hook located at its end which fits into a recess in the wall of the cavity to prevent the clip from being moved out of the cavity beyond the closed position. The hook and recess also provide detents which prevent movement of the clip from either its open or closed position without exertion of a specified force.

Also in a preferred embodiment of the invention the lips on the catches, which engage the joint element when the clip is in its closed position, have chamfered side and front edges. This allows some rotary movement of the clip relative to the joint element when the clip is being removed from the joint element and thus reduces the bending moment in the clip which causes breakage.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a plan view of a construction set rod embodying the subject invention.

FIG. 2 is a side elevation view of the rod shown in FIG. 1.

FIG. 5 is a fragmentary plan view at an enlarged scale and in cross-section showing how the rod interacts with the joint element when the clip portion of the rod is in its open position.

FIG. 6 is a side elevation view corresponding to FIG. 5.

DISCLOSURE OF A PREFERRED EMBODIMENT

Figure 3:
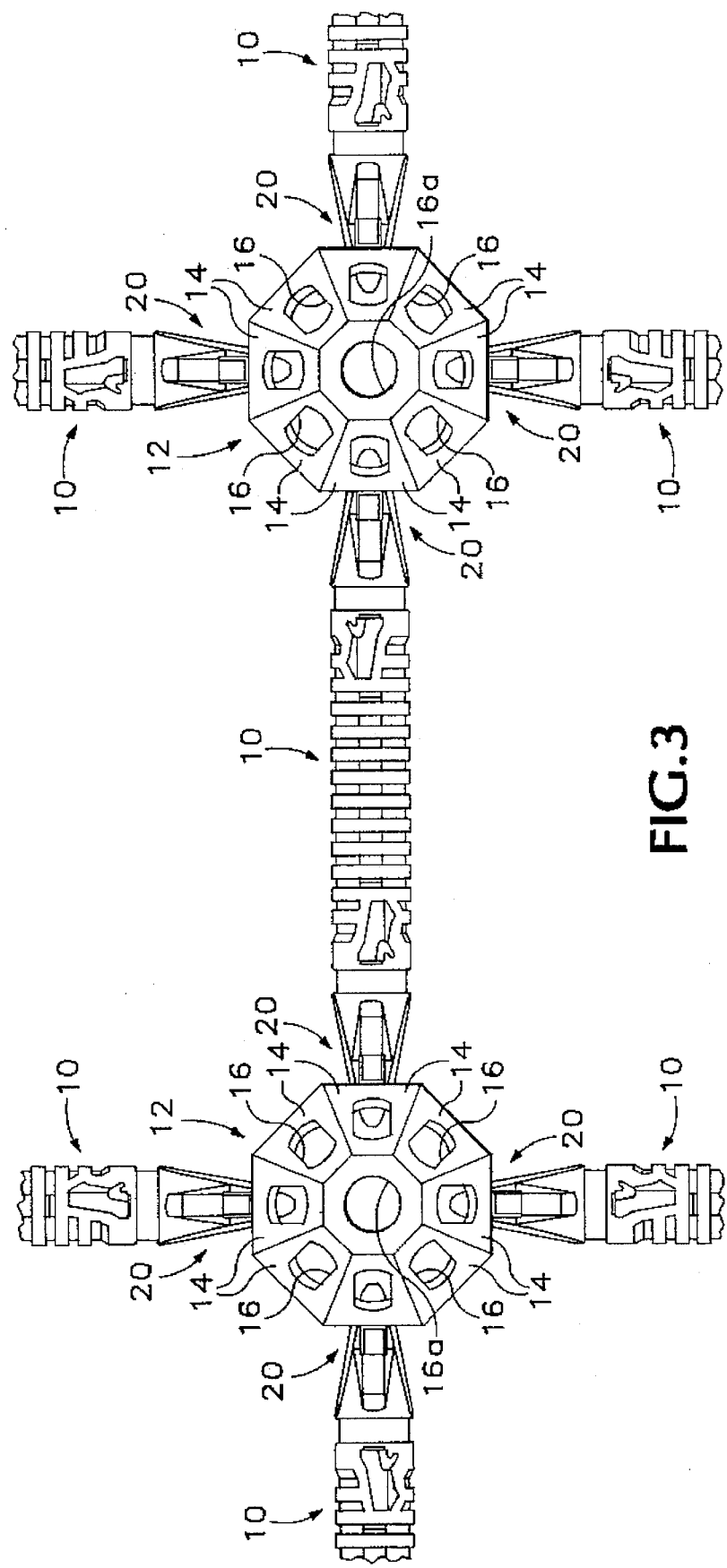
FIG. 3 is a plan view of a plurality of the rods connected to joint elements.
Figure 4:
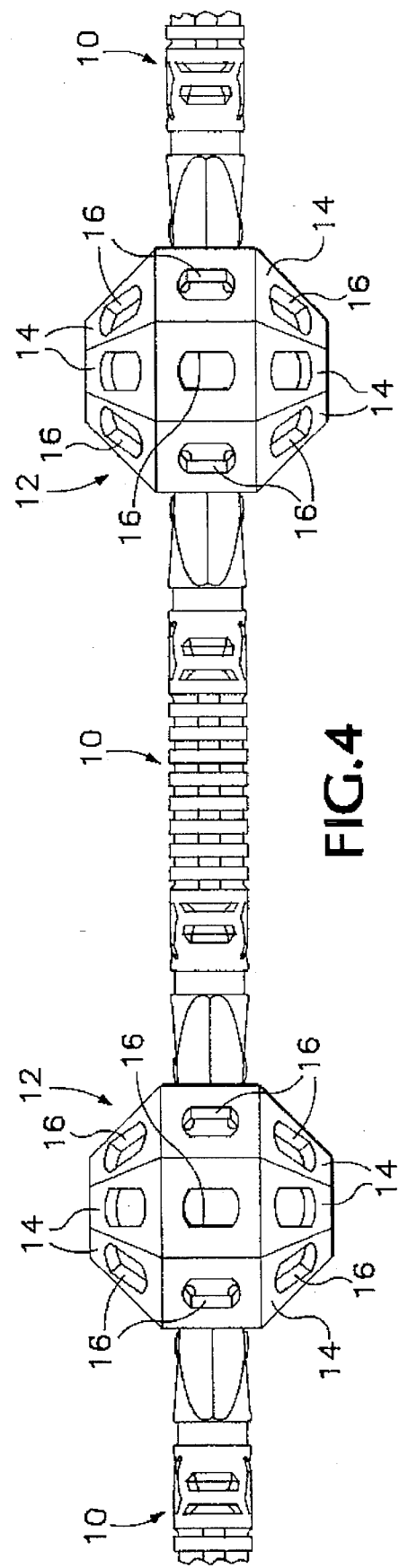
FIG. 4 is a side elevation view of a plurality of the rods connected to joint elements.

Referring to FIGS. 1–4 of the drawings, rods 10 are used to interconnect joint elements 12 in a toy construction set. In the embodiment illustrated the joint elements are hollow spherical balls which are disclosed in detail in Gabriel, U.S. Pat. No. 4,129,975, which is incorporated herein by reference. The joint elements could have other shapes, however, such as a ring, semisphere or flat plate. Each ball has a plurality of planar facets 14 located about its periphery. A joint opening 16 is located in the center of each facet. The joint openings 16a located at the poles of a joint element are circular. All of the rest of the joint openings are generally rectangular except that their short sides are arcuate.

The rods comprise elongate cylindrical struts 18 with clips 20 at each end. The clips have spaced-apart fingers 21 that are deflectable inwardly toward one another and releasably snap fit into the joint openings 16 to permit construction of a three dimensional toy structure. As can be seen in the drawings of U.S. Pat. No. 4,129,975, shorter rods are used to interconnect joint elements in a vertical or horizontal plane and longer rods are used to interconnect joint elements on the diagonal.

Figure 7:
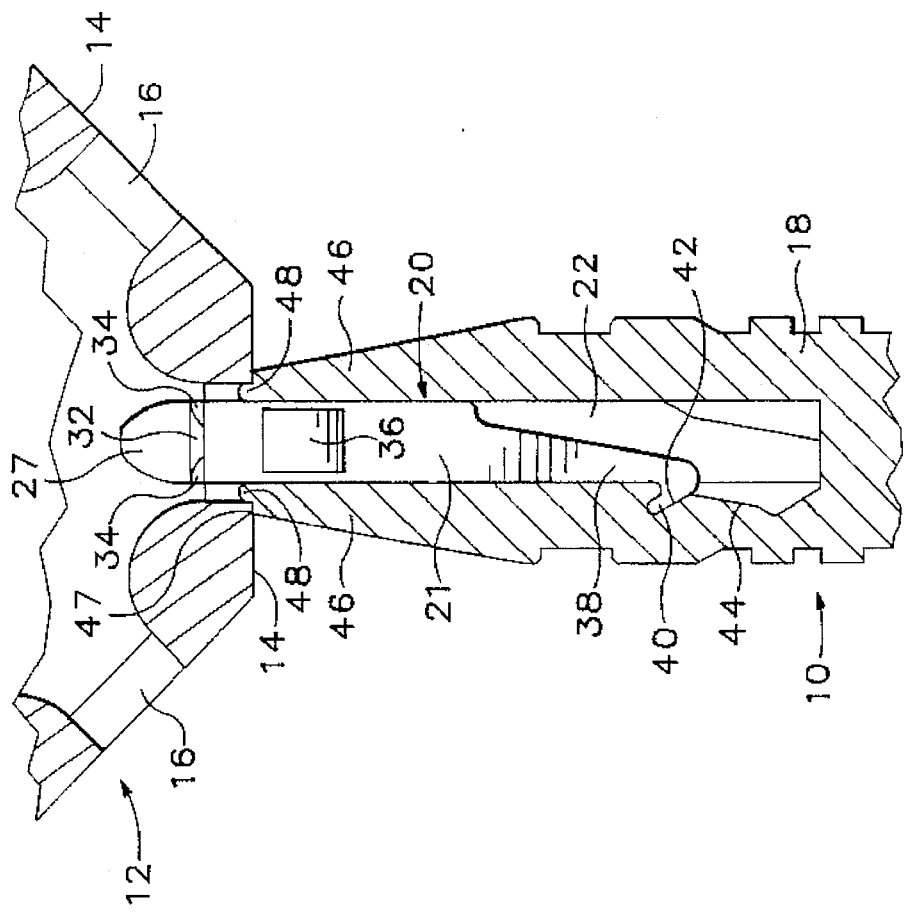
FIG. 7 is a fragmentary plan view at an enlarged scale and in cross-section showing how the rod interacts with the joint element when the clip portion of the rod is in its closed position.
Figure 8:
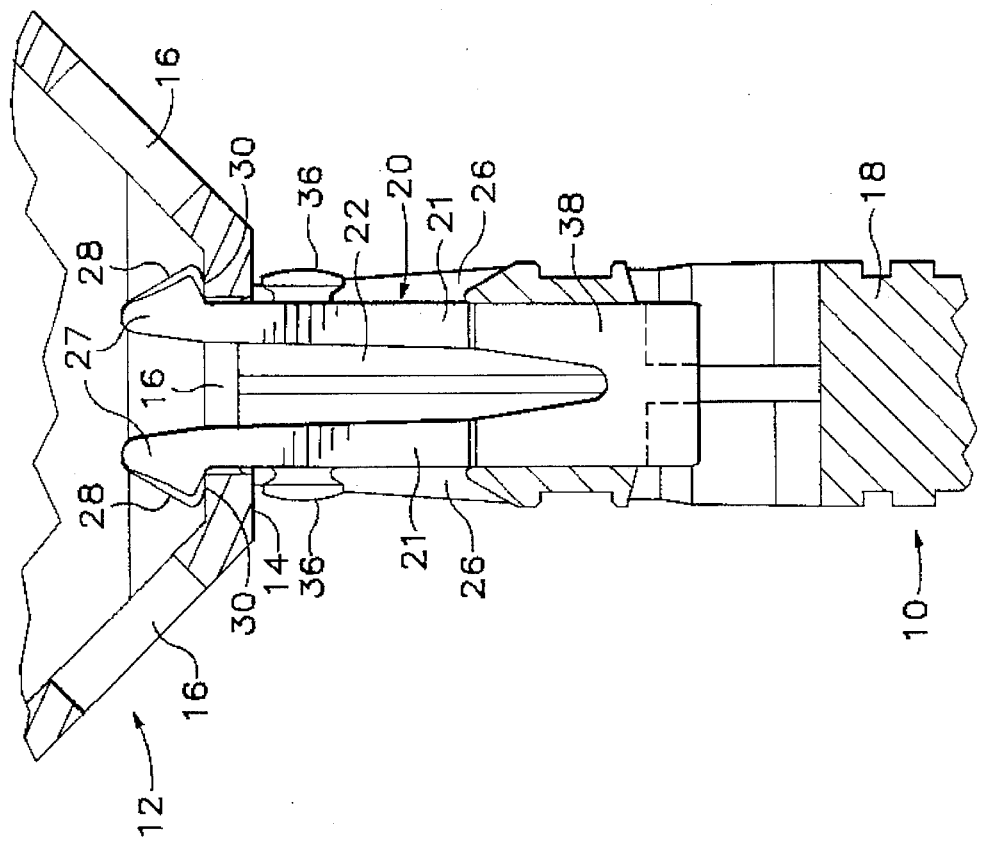
FIG. 8 is a side elevation view corresponding to FIG. 7.

Referring also to FIGS. 5–8, generally rectangular cavities 22 are located in each extremity of the struts, and slots 26 extend through the walls of the struts coextensive with the cavities. The clips 20 are slidably located in the cavities and are moveable between open positions, FIGS. 5 and 6, where the fingers 21 are completely located inside of the cavities, and closed positions, FIGS. 7 and 8, where the fingers 21 extend through a joint opening 16 in a joint element 12.

Located at the extremity of each finger is a catch 27 that extends outwardly from the clip. The catch has a width which is about equal to the width of the slot and is aligned with the slot. Thus, the catch extends through the slot when the clip is moved to its open position so that the fingers are not deflected. The outer face of each catch defined a ramp 28 which is angled with respect to the longitudinal axis of the clip and causes the finger to be deflected inwardly when the clip is inserted into a joint opening 16. A lip 30, which is generally perpendicular to the longitudinal axis of the finger, is located at the end of the ramp 28. The lip engages the inner side wall of the joint element, and locks the rod to the joint element, when the clip is inserted into a joint opening and fully moved to its closed position. The lip 30 has an outer edge 32 and opposed side edges 34 which are chamfered, FIGS. 5 and 7. This allows the clip to be removed from the joint element without breaking, as will be explained more fully later.

Located on each finger alongside the catch 27 is a protrusion 36 that is offset from the catch slightly more than the wall thickness of the joint element and it is also aligned with the slot 26. The protrusions allow the clip to be released from the joint element by urging them toward one another. The protrusions also facilitate sliding the clip between its open and closed positions.

The bottom end of the clip comprises a deflectable hook 38 which is angularly offset from the catches and protrusions by about 90 degrees. The hook interacts with a recess 40 formed in the cavity wall to prevent movement of the clip out of the cavity beyond its closed position. The recess has a first ramp 42 which engages the hook when the clip is in its closed position and serves as a detent to prevent the clip from being moved toward its open position without the application of a predetermined amount of opening force. The recess also has a second ramp 44 which bears against the clip and resists movement of the clip from its closed position toward its open position.

The outer ends 46 of the strut on both sides of the slot 22 are tapered so that the tip 47 of the strut contacts a facet 14 along the longer sides of the joint openings 16. A nub 48 on each strut tip 47 fits into the joint opening to center the strut on the joint opening, and to prevent lateral movement of the strut relative to the joint element.

In operation, one end of a rod 10, with the clip 20 in its open position, is attached to a joint element 12 by placing the strut tip 47 against the desired joint element facet 14 with the nubs 48 projecting into the joint opening 16, FIGS. 5 and 6. It will be noted that the second ramp 44 operates in conjunction with the hook 38 to keep the clip in its open position while the rod is moved into place. The opposed protrusions 36 on the fingers 21 are gripped by the user's thumb and forefinger and the clip is pushed toward the joint element with enough force to cause the hook 38 to be deflected inwardly as it moves up the second ramp 44. As the fingers are moved into the joint opening, the ramps 28 cause the fingers to be deflected inwardly toward one another until the clip reaches its closed position where the catches 27 are completely inside the joint opening and the fingers have snapped back to their normal orientation and the lips 30 engage the inner wall of the facet 14 to lock the clip in place on the joint element. The hook 38 reaches the top of the recess 40 at this point preventing further movement of the clip into the joint element, and the engagement of the hook 38 with the first ramp 42 of the recess holds the joint element in this position.

The other end of the rod 10 is attached to another joint element and a structure is constructed by interconnecting the desired array of joint elements and rods.

When the structure is to be dissembled, or a particular rod is to be removed to alter the structure, the protrusions 36 are grasped between the user's thumb and forefinger and the fingers 21 are deflected inwardly toward one another until the lips 30 pull free of the facet sidewalls. The clip is then pushed into the strut until the clip is in its open position.

The primary advantage of the rod of the subject invention over the rod disclosed in U.S. Pat. No. 4,129,975 is that the separate strut and sliding clips permits a rod to be removed from a pair of joint elements in an existing structure without having to distort the structure to where breaking or dissembly is likely to occur.

In addition, the tendency of the clips disclosed in U.S. Pat. No. 4,129,975 to break when being removed from a joint element is overcome. With the clips only being a small portion of the overall rod they can be made from a superior quality plastic without greatly increasing the overall cost of the rod. Secondly, by chamfering the corners 32, 34 of the lip, the rod has freedom to rotate without bending and thus less bending moment is exerted on the clip when the rod is twisted while it is being removed. Lastly, since the joint element is secured between the lip 30 on the clip and the tip 47 of the strut, and there is some movement between the clip and the strut due to their being separate elements, less bending moment is likely to be exerted on the clip in the first place.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A rod for interconnecting multiple joint elements having elongate joint openings defined therein, said rod comprising:

(a) an elongate strut having a cavity located in each extremity thereof;

(b) clips that slidably fit within said cavities, each clip including opposed, spaced-apart fingers that are deflectable inwardly toward one another;

(c) said fingers having outwardly facing catches located at the extremities thereof; and (d) each said clip being movable in said strut between an open position where said clip is substantially entirely located within its respective cavity, and a closed position where said clip extends partially into a joint opening and the joint element is clamped between the end of the strut and said catches so that said clip is attached to the joint element.

2. The rod of claim 1 further comprising:

(a) said strut having a slot defined in each extremity which extends through the strut and the respective cavity;

(b) said fingers having outwardly facing protrusions that are spaced-apart from said catches, said catches and said protrusions having approximately the same width and being aligned with said slots; wherein (c) said protrusions extend through said slots to facilitate removing one of said clips from the joint element by pushing inwardly on said protrusions until said catches are free of said joint element, and then sliding said clip to said open position.

3. The rod of claim 1 further comprising:

(a) said strut defining a recess at each end thereof which opens into a respective cavity; and (b) a hook located on each said clip which is engaged in said recess and prevents movement of said clip out of said cavity beyond said closed position.

4. The rod of claim 3 wherein said recess includes a first detent which interacts with said hook to prevent movement of said clip into said cavity when it is in said closed position, until a predetermined amount of force is exerted on said clip.

5. The rod of claim 3 wherein said recess includes a second detent which interacts with said hook to resist movement of said clip from said open position to said closed position.

6. The rod of claim 1 wherein each said catch comprises a lip which is generally perpendicular to the elongate axis of said finger, said lip having an outer edge and opposed side edges, all of which are chamfered to facilitate release of the clip from a joint element.

7. The rod of claim 6 wherein each said catch comprises a ramp which extends inwardly from said lip at an angle with respect to the elongate axis of said finger to facilitate insertion of said clip into said joint opening.

8. The rod of claim 1 further comprising said strut having opposed ends which abut the joint elements adjacent the joint openings, and nubs which protrude from said ends into the joint openings when the rod is attached to the joint elements.

9. A rod for interconnecting multiple joint elements having elongate joint openings defined therein, said rod comprising:

(a) an elongate strut having a cavity located in each extremity thereof;

(b) said strut having a slot defined in each extremity which extends through the strut and the respective cavity;

(c) clips that slidably fit within said cavities, each said clip including opposed, spaced apart fingers that are deflectable inwardly toward one another;

(d) said fingers having outwardly facing catches located at the extremities thereof and outwardly facing protrusions that are separated from said catches by a predetermined distance, said catches and protrusions having approximately the same width and being aligned with said slots, and (e) each said clip being movable in said strut between an open position where said clip is substantially entirely located within its respective cavity, and a closed position where a joint element is clamped between the end of said strut and said catches so that said clip is attached to the joint element when said clip is inserted through the joint opening.

* * * * *